RICHARD R. KRAMER
INVENTOR.

BY Fraser and Bogucki

ATTORNEYS

May 9, 1967  R. R. KRAMER  3,317,960
THERMOPLASTIC FORMING MACHINES
Filed March 12, 1962  3 Sheets-Sheet 2

RICHARD R. KRAMER
INVENTOR.

BY Fraser and Bogucki

ATTORNEYS

May 9, 1967  R. R. KRAMER  3,317,960
THERMOPLASTIC FORMING MACHINES
Filed March 12, 1962  3 Sheets-Sheet 3

RICHARD R. KRAMER
INVENTOR.

BY Fraser and Bogucki

ATTORNEYS

United States Patent Office 3,317,960
Patented May 9, 1967

3,317,960
THERMOPLASTIC FORMING MACHINES
Richard R. Kramer, Los Angeles, Calif., assignor to American Thermoform Corporation, Culver City, Calif.
Filed Mar. 12, 1962, Ser. No. 179,113
7 Claims. (Cl. 18—19)

This invention relates to the production of shaped objects from sheets of thermoplastic material, and more particularly to the preparation of Braille reproductions.

"Thermoplastic" materials are those which undergo a plastic deformation when exposed to temperatures in excess of their softening point. When in a softened plastic condition, these materials can be made to assume desired configurations involving complex curvatures, which configurations they will retain upon cooling. In addition to the capability of forming complex shapes, thermoplastic material techniques can provide low cost but strong and light weight products.

Certain advantages are obtained in the processing of thermoplastic materials by using vacuums to draw the softened thermoplastic material into a mold or master (known as vacuum forming), or about an article to shape what are known as contour and skin packages. It is also known to provide a vacuum through a permeable member which has the three-dimensional configuration which is to be reproduced. The last-mentioned technique has been used, for example, in reproducing Braille pages, the master page being sufficiently permeable for the thermoplastic sheet to be drawn down upon it.

This method of reproducing Braille copy has a number of potential advantages which have not heretofore been realized. It requires neither skilled labor nor appreciable time, and is free from mistakes if the master sheet is free from mistakes. It is sufficiently low in cost to obviate the necessity for setting up for machine duplicating, except for the largest production runs. The resultant copy sheet may be much more durable and permanent than the original, and may in addition contain relief representations in three dimensions which constitute pictorial matter obtainable at low cost in virtually no other way.

Improved techniques for forming thermoplastic materials should provide a number of desirable factors which perhaps may best be understood in the particularly critical application involving Braille reproductions. Any machine for producing reproductions is required to provide a heat cycle in which the material of the thermoplastic sheet is softened, then drawn down into the desired configuration by the vacuum, and then permitted to cool to the non-plastic state. The problems involved in providing economical heat cycling devices which have long life are well known. If mechanical and electrical parts are selected with high margins of safety to prevent warpage, overheating, heat damage and the proper heat control during the cycle, the machine will be bulky, heavy, expensive and require an excessive amount of power. Various techniques have been employed in prior art devices to eliminate or reduce some of these problems, but these prior art techniques have been such that they usually require long cycling times and skilled operators even though they have also employed higher power pumps and larger heating sources.

A number of specific difficulties have been encountered with prior Braille reproduction machines. They have usually been limited to one size of copy, because it is necessary to seal the thermoplastic sheet about its edges in order to draw the air from under the sheet and through the master. The production of accurate uniform copies under a wide range of ambient temperature conditions, and throughout the life of a machine is a primary requirement for any apparatus of this nature. The thermoplastic sheet must be heated to the plastic state uniformly across its surface, and a vacuum most uniformly be applied to the sheet throughout its entire area. The machine should operate substantially the same during warmup times as after extended use, and in cold as well as warm environments, with a minimum of adjustment. The heating circuits should permit compensation for these different variables in simple yet economical fashion.

The nature of the ultimate product is of course of primary importance. Stiff or thick sheets cannot be bound into book form or stored conveniently. Sheets which soften in hot weather or under direct heating from the sun are apt to lose the reproduced Braille pattern. Thin sheets of conventional material are fragile and will tear or become frayed much too rapidly. The "feel" of the material to the touch of the user is very important, because the Braille user often objects to an excessively soft and silky material, due to the fact that it is difficult to handle and to "read." Many prior thermoplastic materials are not suitable for Braille because of this excessive smoothness, even though they have good characteristics for vacuum forming, and good physical strength.

An object of the invention is to provide improved apparatus for the reproduction of Braille material.

Another object of the present invention is to provide improved apparatus for the preparation of three-dimensional copies of material with thermoplastic sheets.

A further object of the present invention is to provide an improved article useful as Braille reproductions.

In accordance with the present invention, apparatus for the preparation of Braille copies or other thermoplastic sheet reproductions may utilize a replaceable clamping structure which simultaneously provides a vacuum seal and a peripheral clamp for the thermoplastic sheet which is to be formed into the configuration of a master. The master copy is placed on a perforated platen having a resilient peripheral rim which is so configured as to establish a spacing which defines a low volume plenum chamber between the platen and a base plate upon which it rests. The plenum chamber is evacuated through an opening in the base plate. The thermoplastic sheet is placed above the master as it rests on the platen, and a frame which engages the periphery of the thermoplastic sheet with a resilient seal is locked against the platen, in turn locking the platen against the base plate. A feature of the invention is the use of the very small plenum chamber between the platen and the base plate, this spacing being maintained by a small flat element inserted adjacent the inlet aperture. With this arrangement, the single action of locking the upper frame to the base plate provides the vacuum seal for the plenum chamber and simultaneously seals and clamps the film. The very low plenum chamber volume permits rapid application of the vacuum with a low capacity pump, and the single clamp mechanism permits rapid release of the members when the heating cycle has been completed.

Another feature of systems in accordance with the invention is the unique disposition and operation of the heating coil arrangement. For heating of the thermoplastic sheet, a cover is drawn over the sheet so as to place heating coils just above and substantially coextensive with the sheet. These coils are arranged in two sections, a first being an outer coil extending about the periphery of the sheet, and the second an inner coil juxtaposed opposite the interior regions of the sheet. The outer coil is constantly maintained at a higher temperature, but the inner coil is energized in a time modulated fashion, depending upon the temperature level which it is desired to maintain during the operative cycle. This arrangement provides substantially uniform heating across the sheet, with a minimum of wastage of heating power.

Another feature of the invention is the use of removable perforated platens and clamping frames so disposed and mounted relative to the base plate that other platens and clamping frames of different sizes may be substituted. By this means, the same mechanism may be used for different size reproductions.

Another feature in accordance with the invention is the provision of an improved Braille sheet of a calendered vinyl thermoplastic having a roughened matte texture. The material is partially rigid and is found to be eminently satisfactory for Braille users. Colored, partially rigid, sheets of this character are additionally particularly suitable for Braille reproductions because they can best match the spectral distribution of the radiant energy emanating from the heater, permitting more rapid cycling with less heat. Additionally, the sheets are more resistant to weathering, abrasive and tearing effects than are the masters, and can also be bound, punched, written on and "erased" for the preparation of a new impression.

A better understanding of the invention may be had by reference to the following description, taken in conjunction with the accompanying drawings, in which.

Figure 1:
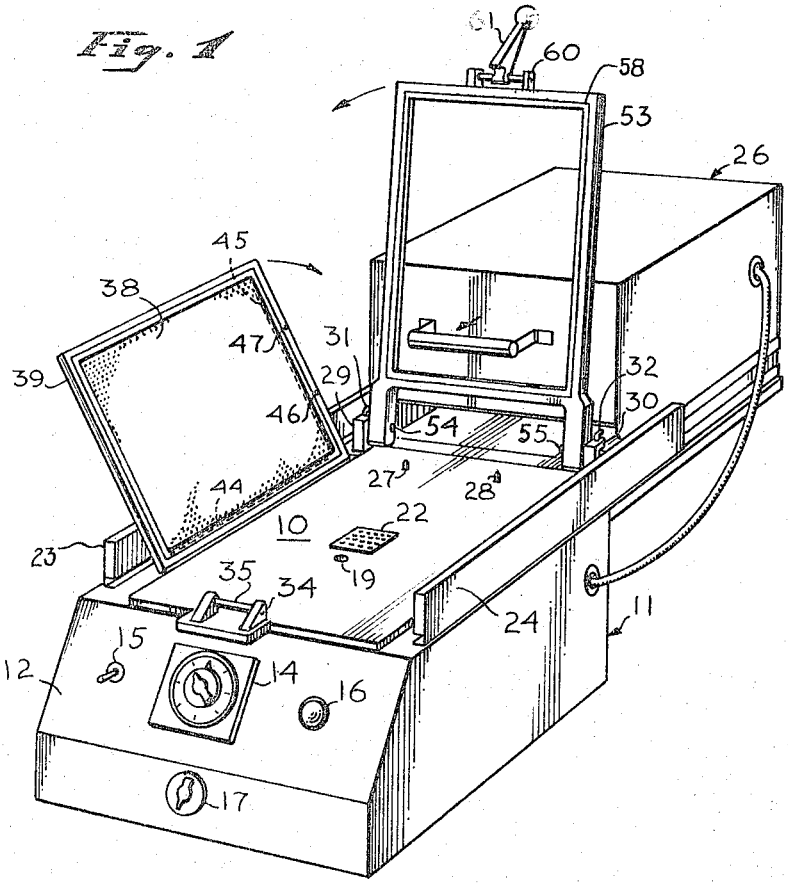
FIG. 1 is a perspective view of a thermoplastic forming machine in accordance with the present invention showing various elements in non-operating position for clarity.

Referring now to the drawings, devices in accordance with the invention are shown and described in conjunction with a machine for the reproduction of reading material for the blind, here characters in the Braille code. Actually of course, those skilled in the art will recognize that other forms of coding may be employed, such as moon characters and even binary codes. Furthermore, the representations which are copied may cover a wide range of three-dimensional objects, formed individually or spaced about the sheet. Apparatus in accordance with the invention need not be concerned with reading or educational material for the blind, but can provide particular advantages for other applications as well. The great benefits derived from the preparation of such reading material, however, establishes this as a particularly useful example of the application of the invention.

Figure 2:
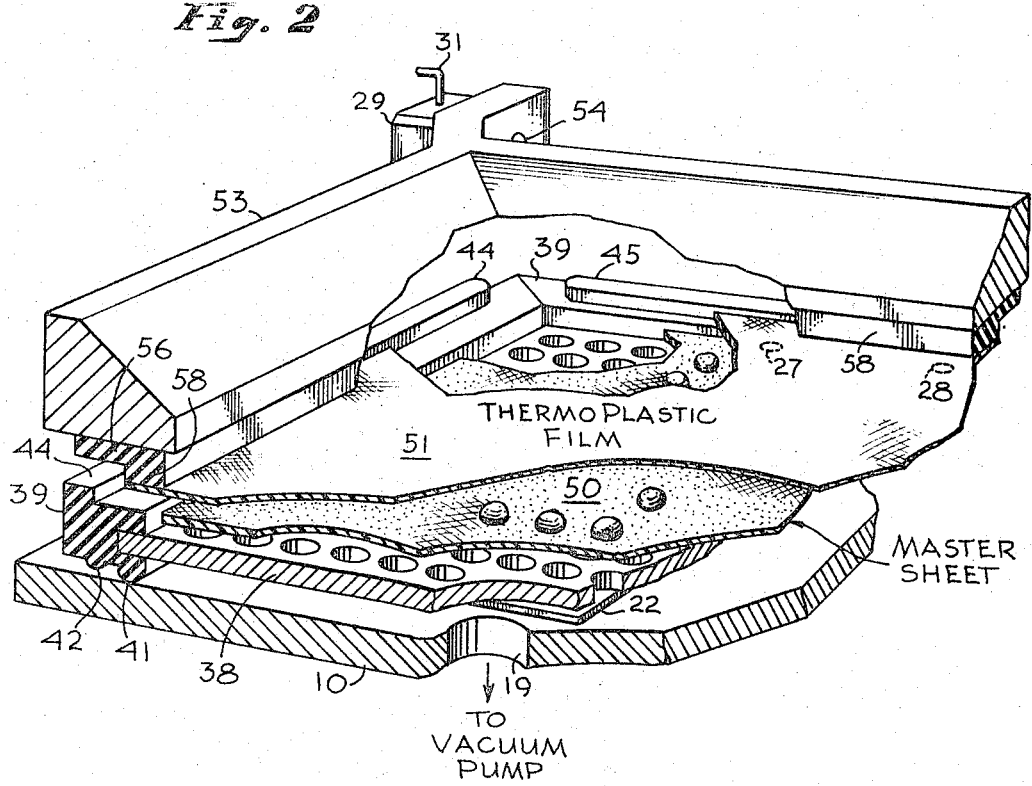
FIG. 2 is an enlarged perspective detail view of the relationship of various elements of the machine of FIG. 1 to a thermoplastic film.

There is shown, as best seen in FIGS. 1 and 2, a base plate 10 which forms the top of a bottom enclosure 11 within which are contained timing circuits and controls to be described in more detail hereafter. The front panel 12 of the bottom enclosure 11 includes an automatic timer 14, an on-off switch 15, an indicator light 16, and a heat adjustment control 17. A relatively small inlet aperture 19 disposed in a central region of the base plate 10 provides a conduit to a vacuum pump 20 and associated motor 21 contained within the bottom enclosure 11. A small, relatively flat, spacer plate 22 rests or is affixed on the base plate 10 in the region of the inlet aperture 19.

Figure 3:
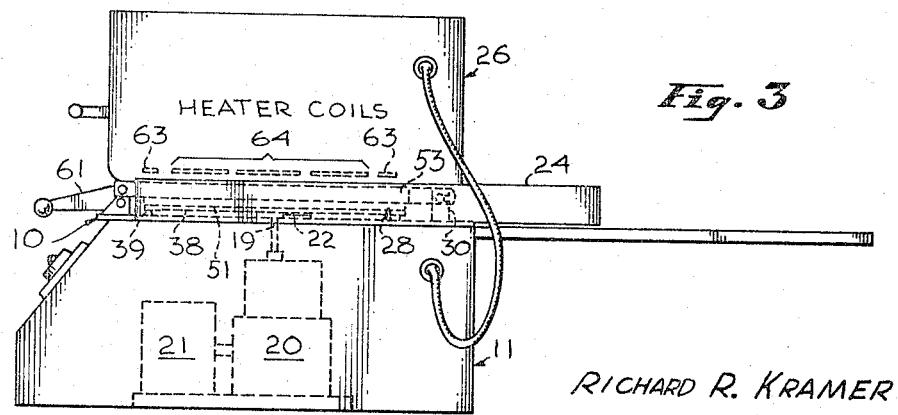
FIG. 3 is a side view of the arrangement of FIG. 1, showing the cover in a different position, with various elements indicated in phantom.

The terms "front," "back," "left," and "right," "top" and "bottom" will hereinafter be used from the viewpoint of an operator standing adjacent the front panel 12. Separate rails 23, 24 are mounted along each side of the bottom enclosure 11, and a heater cover 26 is mounted and supported by low friction roller bearings (not shown in detail) so as to be movable longitudinally back and forth along the rails 23, 24. The heater cover, shown in the back position in FIG. 1 and in the operative position in FIG. 3, is coupled by flexible cabling to the control circuitry within the bottom enclosure 11, this circuitry and the arrangement of the heater coils within the cover 26 being described in detail below. When moved fully forward to the front position in which it extends over the base plate 10, the heater cover 26 may engage a switch (not shown in detail) which starts an automatic cycling operation to control the various operative elements of the system. The cycle of course may also be controlled manually if desired.

Also mounted on the base plate 10 are a pair of positioning pins 27, 28 and a pair of upstanding brackets 29, 30 each being at a different rear side of the base plate 10. Each of the brackets 29, 30 includes a removable pivot pin, in the form of a side opening which may be closed by a locking pin 31, 32 after the pivot pin has been installed, and which may be withdrawn to permit removal of the pivot pin mechanism. At the front of the base plate 10 is mounted a fixed bracket 34 including a bolt 35 to which a clamping mechanism may be affixed.

Figure 4:
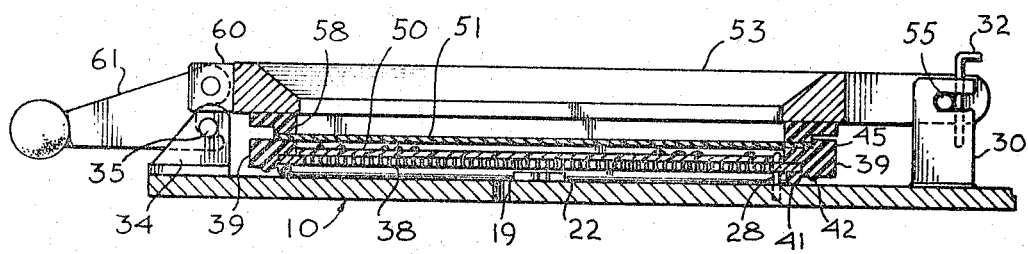
FIG. 4 is a simplified sectional view of a part of the arrangement of FIG. 1, showing the relationship of various elements of the machine to the thermoplastic sheet.

The element upon which the master to be copied and the thermoplastic film sheet are positioned is the perforated platen 38 (best seen in FIGS. 1, 2 and 4) having a peripheral sealing rim 39 of a resilient material. A number of advantages are derived from constructing the perforated platen 38 and the rim 39 in accordance with certain features of the invention. Some of these features may best be understood by reference to the detailed view of FIG. 2. The rim 39 is preferably bonded integrally with the outer periphery of the platen 38, thus extending some distance inwardly with respect to the platen 38 and eliminating the problem of air leakage between the rim and platen. The rim 39 is also provided with a pair of under beads which run along the length of the rim and about the entire periphery of the platen 38. An inner one of these beads 41 is positioned adjacent the flat side of the platen 38, so that it is backed by the firmness of the platen 38. This bead 41 is slightly larger than the outer bead 42, which is backed only by the resilient rim 39 material. Two edges of the rim 39, namely the left edge and back edge relative to the platen 38 are provided with shoulders 44, 45, against which a thermoplastic film sheet may be abutted to be precisely positioned.

Two indexing holes 46, 47 are provided along the back edge of the rime 39, these holes being located to register with the positioning pins 27, 28 and to provide a ready means of fixing the location of the platen 38. When the platen 38 is thus removably located in operating position, the inlet aperture 19 is within the central region within the inner bead 41. The spacer plate 22, which may be a small fraction of an inch in height, is also located within the central region and maintains the perforated platen 38 off the base plate 10 against the force of atmospheric pressure when the vacuum is drawn.

With the platen 38 located in position on the base plate 10, a master Braille sheet 50 is positioned centrally within the region of the peripheral rim 39. The master sheet 50 may be clamped in the ensuing process, but need not be. The sheet 50 should, however, be of an adequately pervious material, the types of paper ordinarily used for Braille print being satisfactory for this purpose. A material substantially impervious to air may of course be treated to provide adequate air leakage by being punctured or perforated with minute holes.

A thermoplastic film sheet 51 of size and shape adequate to be coextensive with the peripheral rim 39 of the platen 38 is then placed over the master Braille sheet 50 and in abutting relations to the shoulders 44, 45 at the left and back sides of the platen 38 (see FIG. 2 particularly). A unitary sealing of the plenum chamber formed under the perforated platen 38 and a peripheral restraint of the thermoplastic sheet 51 are then simultaneously achieved by moving down a clamping frame 53 which is pivotally mounted in the back brackets 29, 30 on the base plate 10.

The clamping frame 53 is of generally rectangular structure, and at its back edge is provided with a pair of pivot pins 54, 55 which register in the openings of the brackets 29, 30 and thereby provide bearing support for the clamping frame 53 to be pivoted into an upper position, as shown in FIG. 1. When the clamping frame 53 is moved down into position against the platen 38, a resilient seal 56 on the underside of the clamping frame 53 engages the rim 39 about the entire periphery of the perforated platen 38. The resilient seal 56 is provided with a protruding shoulder 58 which engages the platen rim 39 on the opposite side from the two beads 41, 42 which rest against the base plate 10. It will also be understood that the thermoplastic film sheet 51 is interposed between the shoulder 58 and the peripheral rim 39 about the entire periphery of the platen 38, as seen in FIG. 2.

A toggle arm clamp 60 having a handle 61 is pivotally mounted on the front edge of the clamping frame 53. When the clamping frame 53 is moved down into clamping engagement with the thermoplastic sheet 51 and the platen 38, it is then locked into position and maintained under a fixed amount of pressure by simply moving the toggle arm clamp 60 down into locking position against the bolt 35 (FIG. 3).

Figure 5:
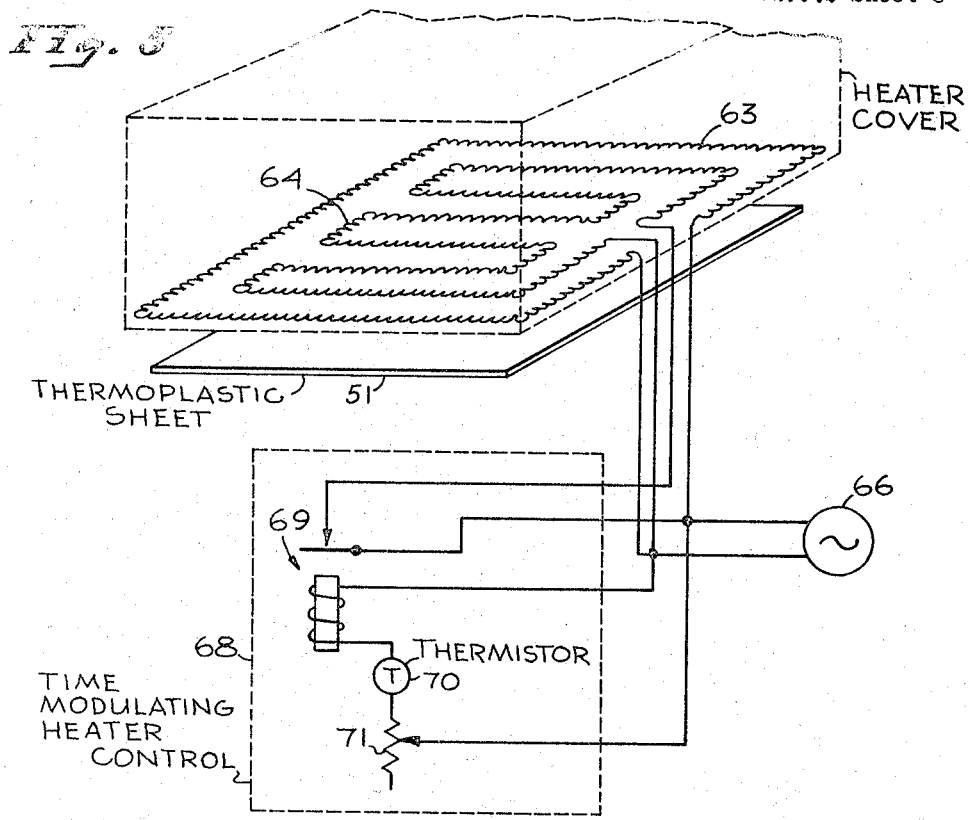
FIG. 5 is a simplified perspective view of the heating coil arrangement and a schematic circuit diagram of the heating coil control circuit.

The electrical circuitry and the disposition of the heating coils are shown in somewhat idealized form for clarity in FIG. 5. An outer coil 63 extends around the periphery of an opposed thermoplastic sheet 51, within the heater cover 26. An inner coil 64 is serpentined within the area defined by the outer coil 63, so as to provide heating elements throughout the entire area. Both the outer coil 63 and the inner coil 64 derive power from an alternating current source 66, the outer coil 63 being directly coupled and therefore maintained on continuously. The inner coil 64 is coupled to the source 66 through a time modulating heater control 68. The circuit of the heater control 68 includes a switch 69 in series with the inner coil 64 and controlled by a thermistor 70 and an adjustable resistor or potentiometer 71. The thermistor 70 is a device having a negative resistance characteristic with temperature, as usually determined by the surrounding temperature and the internally generated temperature when a current is passed through it. The potentiometer 71 provides a means of controlling the amplitude of the current passed through the thermistor 70.

In this arrangement, the switch 69 provides a means of disconnecting the circuit of the inner coil 64. Energization of the switch 69 is controlled by the amplitude of the current provided by the thermistor 70 and potentiometer 71 series combination. The energizing coil of the switch is normally deenergized and the controlled armature tends to remain closed, providing current through the inner coil 64 from the source 66. After a time determined by the setting of the potentiometer 71, from the heat adjustment control on the front panel 12, the thermistor 70 becomes heated to a level at which its resistance value experiences a sharp dropoff, thus markedly increasing the current and energizing the switch 69 to break the circuit between the source 66 and the inner coil 64. As the thermistor 70 cools down the resistance increases and the switch 69 again closes, to start another interval of energization of the inner coil 64.

The many advantages and features of apparatus in accordance with the invention will become apparent from a description of the formation of a Braille copy from a previously prepared master. With the clamping frame 53 which is used for a selected size of copy in the tilted up position, the perforated platen 38 is positioned so that the indexing holes 46, 47 register with the positioning pins, 27, 28 on the base plate 10. The master sheet 50 is placed directly on the platen, and the thermoplastic film sheet 51 is then placed over the master sheet 50, and with its margins in precise position by being abutted against the shoulders 44, 45. The clamping frame 53 is then swung down over the thermoplastic sheet 51, and the toggle arm clamp 60 is engaged to the bolt 35 of the fixed bracket 34 at the front panel 12. By these simple steps, the mechanism is made ready for the heating cycle. A small plenum chamber is defined under the platen 38, this chamber being completely air-sealed at the base plate surface because of pressure of the beads 41, 42 against the base plate 10. The thermoplastic sheet 51 is firmly clamped around its entire outer periphery, and additionally is sealed against a vacuum, being wedged between the shoulder 58 on the seal 56 of the clamping frame 53 and the resilient rim 39 of the platen, which is bonded to the platen and thereby prevents leakage.

The heating cycle may then be commenced by moving the heater cover 26 forward over the rails 23, 24 until it is directly over the clamping frame 53 and the thermoplastic film sheet 51. Assuming that an automatic switch (not shown) is engaged by the heater cover at the forward extent of its travel, a control cycle governed by the automatic time 14 is then undertaken. The dual element heater, consisting of the outer and inner coils 63, 64 respectively, is turned on, and the outer coil 63 is held on continuously while the inner coil 64 is governed by the time modulating heater control 68 as described above. Continual radiation of heat from the peripheral outer coil compensates for the dissipation of heat through radiation, convection and conduction, this dissipation being greatest at the sides of the mechanism. The time modulated excitation of the inner coil 64, in combination with this arrangement, provides several distinct advantages. First, it is found to provide satisfactory control of the temperature level generated within the thermoplastic sheet 51. The variation of the duty cycle may extend from fractions of a second to many seconds, where a high level of heat is needed, although in the usual case it will cycle every few seconds.

In approximately 2 seconds after the start of the heating, the thermoplastic sheet 51 begins to be heated above its softening point, and the vacuum pump 20 is turned on by the automatic timer 14, evacuating the plenum chamber and the volume between the top of the master sheet 50 and the bottom of the thermoplastic sheet 51. Thus atmospheric pressure acting against the vacuum which is created forces the now plastic sheet 51 into the configuration of the master sheet 50, the edges of the thermoplastic sheet 51 still being clamped securely. Operation of the pump is indicated to the operator by the light 16 on the front panel 12, and within a very brief interval (less than a few seconds) the exact reproduction is completely formed. The heater cover 26 may then be pushed to the rear position. The toggle arm clamp 60 and the clamping frame 53 may be opened by a single motion of the handle 61 and the vacuum pump turned off by the switch 15.

The copy cools very quickly as soon as the coils are removed, and is thereafter permanently formed. The entire cycle, involving placement of the sheets, locking of the frame, heating of the sheet, release of the formed copy and shutting off the machine takes little more or less than 3 seconds. Copies may be made over an extended period of time at the conservative rate of four copies per minute, and it is evident that no particular training or experience is required for the achievement of these rates.

When it is desired to provide copies of other sizes, an appropriate sized platen 38 and clamping frame 53 can be substituted very quickly. The original platen 38 is merely raised off the positioning pins 27, 28 and the new different sized platen is inserted. The new platen will again have shoulders against which the thermoplastic sheet may be abutted to achieve proper marginal positioning. The new clamping frame 53 of appropriate size is substituted merely by removing the locking pins 31, 32, withdrawing the previous clamping frame, reinserting the new clamping frame 53, and reinserting the locking pins. The toggle arm clamp 60 is mounted on an extension of the clamping frame 53, if need be, in order to cooperate properly with the locking bolt 35 on the base plate 10.

Particular benefits are derived from the arrangement of the minimum volume plenum chamber underneath the platen 38. It is desired to exhaust this volume as quickly as possible, but it had heretofore been thought that a high volume pump, and therefore a large motor, were needed for proper efficiency. In order to reduce the pressure in the plenum chamber by 20 inches of mercury, or more, so that nearly atmospheric pressure is acting upon the thermoplastic sheet, it would at first appear that a high capacity pump is needed. On the other hand, it has also been considered that a large plenum chamber is required, in order to prevent restriction of the flow of air and thus further place excessive demands on the pump. In accordance with the invention, however, a very small spacing (1/16 inch, for example) may be used between the platen and the base plate, and a relatively low capacity pump may be employed. The use of a spacer element is found to be convenient for preventing restriction of flow, but adequate evacuation can nonetheless be achieved very quickly. As the evacuation begins, the pump is operating at highest efficiency, whereas after a partial degree of vacuum has been established the pump efficiency decreases, as is well known. With the minimum plenum volume, however, relatively little air must be withdrawn to increase the degree of vacuum appreciably, and total evacuation to the desired degree is effected very quickly.

Another important aspect of the present invention relates to the thermoplastic sheet which is found to be superior for this apparatus. The same considerations also make the same sheet superior for many other applications as well. Preferably, this is a calendered vinyl thermoplastic sheet of a light green color and of approximately 5-mil thickness for Braille reproductions. The heat softening point of this material is selected to be at about 130° F., and the material is further selected to have a partial rigidity. The drapability of the material is such that, in other words, with a slight folding a sheet of 10 by 11 inches may be lifted by one corner and a strip of a few inches may be held substantially horizontal from one end. The use of a colored material provides advantages both in fabrication and in use. A somewhat dark color, such as the light green, best matches the spectral distribution of the radiant energy from the heater, and absorbs heat much more readily, so that the heat level to which other parts of the machine must be raised is not as great as would otherwise be the case. In practice, it is found that the use of transparent sheets, which have heretofore been used to a considerable extent, requires that materially higher heating levels be attained, and that a substantially greater burden is placed on the vacuum pump. Transparent materials also allow greater heat transmission to the original master so that often a rapid continuous cycle injures the upper surface of the master. As a result, extended use of such sheets has caused many failures which are not encountered in the employment of thermoplastic sheets in accordance with the invention.

Figure 6:
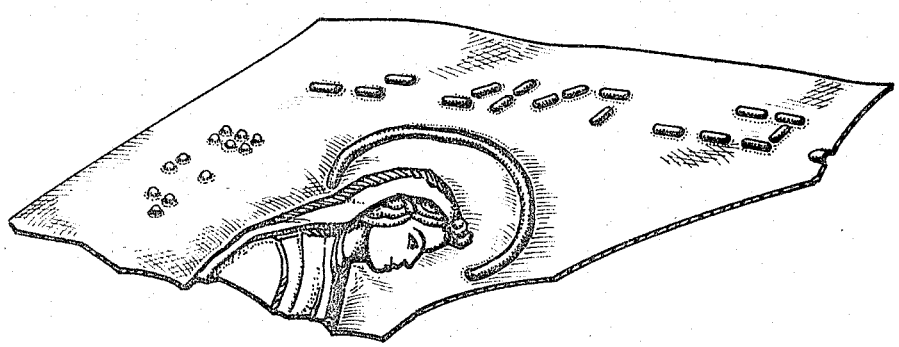
FIG. 6 is an enlarged perspective view of a part of a Braille reproduction produced in accordance with the present invention, showing details thereof.

The enlarged and necessarily pictorial representation of FIG. 6 can only partially indicate the texture, versatility and durability of Braille reproduction made in accordance with the invention. The light green color, although sufficiently dark to provide best heat absorption, is also sufficiently light to permit writing, typing and other indicia to be added using ordinary instruments. Common punches or binding techniques may be used to bind a number of sheets. The sheets are far superior to paper in their resistance to water and corrosion and to tearing effects. The reproduced patterns may also be erased simply by running the thermoplastic sheet through a thermoplastic forming machine while using a plain cardboard backing as the master. On the softening of the sheet as the vacuum is applied the pattern previously imposed disappears permanently.

The texture and versatility of the sheets is therefore only partly evident from the FIG. 6. Although the sheets are thin, they provide a feeling of substance to the blind user, and the roughened matte texture is most pleasing for continuous use. The ability to copy the three-dimensional patterns presented by ordinary household objects, embossed patterns and relief works, provides an exceptional means of instructing blind students. In addition, as shown in FIG. 6, moon type may be copied as readily as Braille.

While there have been described above and illustrated in the drawings certain forms of thermoplastic sheet forming apparatus, and the thermoplastic sheets themselves, it will be appreciated that the invention is not limited thereto, but should be considered to include all alternative forms and modifications falling within the scope of the appended claims.

What is claimed is:

1. A machine for providing thermoplastic sheet copies of original material, including the combination of a base member, an air pervious platen positioned on but separate from the base member, the platen including a resilient rim member, clamping frame means mounted on the base member and including a resilient seal member registering with the rim members of the platen, whereby an air-sealed plenum chamber having relatively low volume is defined between the base plate and a thermoplastic sheet positioned between the platen and the clamping frame means, means communicating with the base plate surface for evacuating the plenum chamber, and means for heating a thermoplastic sheet positioned between the platen and the clamping frame means.

2. A machine for providing thermoplastic film copies of Braille material, including the combination of a base plate member, an air pervious platen positioned on the base plate member, the platen including a resilient rim member and including a pair of shoulder elements for positioning a thermoplastic sheet, a pivotable clamping frame mounted on the base plate member, and including a resilient seal member registering with the rim member of the platen, means for locking the clamping member to the base plate member, with a thermoplastic film held between the registering members, whereby a compressed seal is formed between the base plate member and the platen, and also between the platen and the clamping frame, means communicating with the base plate surface for evacuating the volume between the base plate member and the platen, and means for heating a thermoplastic sheet positioned between the platen and the clamping frame.

3. A machine for making thermoplastic sheet copies of air pervious sheet material saving any combination of protruding and recessed patterns thereon, the machine including a base plate member, platen means partially defining a plenum chamber removably positioned on the base plate member, the platen means including a peripheral rim of resilient material bonded to the platen means, the peripheral rim including a pair of peripheral under beads engaging the base plate member and a pair of positioning shoulders against which a thermoplastic sheet may be abutted, the thermoplastic sheet when so abutted extending at least partially over the peripheral rim around the entire periphery, the platen means receiving an air pervious master sheet between the upper surface of the platen means relative to the base plate and the thermoplastic sheet, the thickness of the peripheral rim member and the under beads being sufficiently small to define a relatively low volume plenum chamber under the thermoplastic sheet, a pivotally mounted clamping frame coupled to the base plate member, the clamping frame being dimensioned and configured to correspond generally to the periphery of the platen member, and including a resilient seal member on the under side thereof configured to register with the rim member of the platen means, thereby to restrain the thermoplastic sheet around its entire periphery, means detachably engaging the free end of the pivotally mounted clamping frame to the base plate member, in compressed relation, thereby to maintain a firm restraint around the entire periphery of the thermoplastic sheet, while providing an air tight seal around the plenum chamber, and between the thermoplastic sheet edges and the plenum chamber, means positionable above the platen means for heating an interposed thermoplastic sheet above its softening point, and means communicating with the surface of the base plate member for evacuating the plenum chamber below the interposed thermoplastic sheet.

4. In a machine for making thermoplastic sheet copies of master sheets by drawing heat softened thermoplastic sheet material down on the master sheet under a vacuum, the improvement comprising a heater assembly positionable above the thermoplastic sheet and characterized by an outer heating element extending generally around the periphery of the thermoplastic sheet, an inner heating assembly containing lengths of heating element which lie within the interior area defined by the outer heating element, means coupled to continually energize the outer heating element, and adjustable time modulated means coupled to energize the inner heating element with varying heating duty cycles dependent upon the temperature level in the thermoplastic sheet which it is desired to achieve.

5. For a machine for producing thermoplastic sheet copies of an air pervious master sheet by drawing the heat softened thermoplastic sheet down over the master sheet under a vacuum, the improvement comprising a minimum volume plenum chamber including a base plate member, an apertured platen positioned on the base plate member, the apertured platen including a peripheral seal and receiving a master sheet on the surface thereof, the peripheral seal being of an elastic material, a thermoplastic sheet positioned on the apertured platen member and being at least partially coextensive with the peripheral seal around the entire periphery thereof, clamping means coupled to the base plate member and detachably engaging the thermoplastic sheet to the peripheral seal of the platen in compressed relation around the entire periphery thereof, whereby the thermoplastic sheet is held under firm restraint at its periphery, and an air sealed plenum chamber is established, the spacing of the platen from the base plate providing a plenum chamber which is a small fraction of an inch in height, means communicating with the surface of the base plate for withdrawing air therefrom, and spacer means positioned between the base plate surface and the perforated platen member.

6. For a machine for producing thermoplastic sheet copies of an air pervious master sheet by drawing the heat softened thermoplastic sheet upon the master sheet under a vacuum, the improvement comprising a minimum volume plenum chamber including a base plate member, an apertured platen positioned on the base plate member, the platen including a peripheral seal of elastic material, and clamping means coupled to the base plate member and detachably clamping a thermoplastic sheet to the peripheral seal of the platen around its entire periphery, the spacing of the platen from the base plate providing a plenum chamber which is a small fraction of an inch in height.

7. A vacuum forming machine comprising a base plate having a vacuum aperture, a removable platen having a resilient peripheral bead, positioning pin means on the base plate engaging the platen for holding the platen in fixed relation to the base plate, clamping frame means pivotally mounted on the base plate, the clamping frame means being removable from the pivotal mounting and having a resilient seal member registering with the peripheral bead of the platen, and locking means mounted on the clamping frame means and engaging the base plate to establish a compressed seal between the clamping frame seal member and the peripheral bead, and between the peripheral bead and the base plate.

References Cited by the Examiner

UNITED STATES PATENTS

| | | | |
|---|---|---|---|
| 2,294,228 | 8/1942 | Derby. | |
| 2,303,826 | 12/1942 | De Bell. | |
| 2,377,946 | 6/1945 | Leary | 18—14 XR |
| 2,493,439 | 1/1950 | Braund | 264—92 |
| 2,663,663 | 12/1953 | Weltman et al. | 161—116 |
| 2,765,493 | 9/1956 | Winstead | 18—19 |
| 2,814,077 | 11/1957 | Moncrieff | 18—56 |
| 2,832,092 | 4/1958 | Groth | 18—18 |
| 2,836,852 | 6/1958 | Butzko | 18—19 XR |
| 2,926,385 | 1/1960 | Wilson | 18—19 XR |
| 3,061,881 | 11/1962 | Sherno | 18—19 XR |
| 3,072,964 | 1/1963 | Tilden | 18—19 |
| 3,127,497 | 3/1964 | Taylor | 18—19 |
| 3,154,461 | 10/1964 | Johnson | 161—116 |
| 3,156,012 | 10/1964 | Hirtz | 18—19 |
| 3,179,980 | 4/1965 | Ryan et al. | 18—19 |
| 3,196,488 | 7/1965 | Jones-Hinton et al. | 18—19 |
| 3,207,821 | 9/1965 | Jones-Hinton et al. | 18—19 XR |

WILLIAM J. STEPHENSON, *Primary Examiner.*

EARKE N. BERGERT, *Examiner.*

L. T. PIRKEY, *Assistant Examiner.*